Sept. 23, 1969    B. C. EISENBERG    3,468,098
SPEAR PACKING APPARATUS
Filed July 21, 1967    5 Sheets-Sheet 2
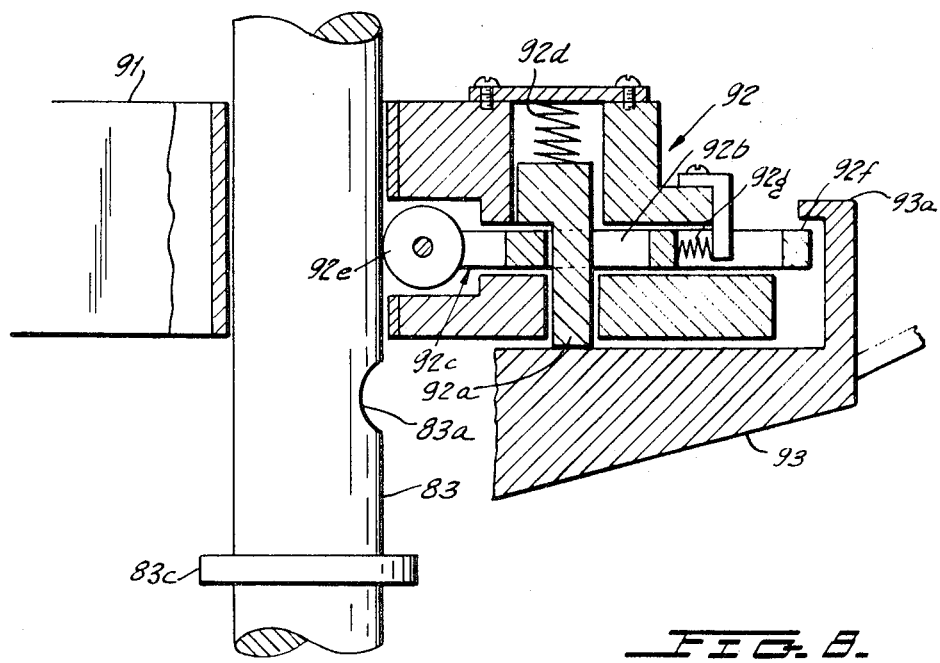
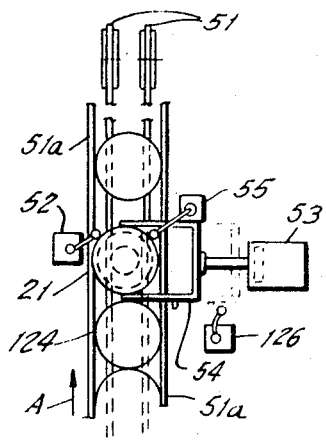
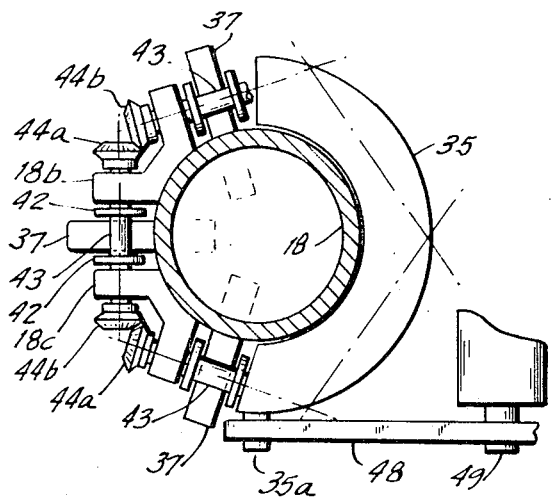
INVENTOR.
BERNARD C. EISENBERG
BY
OSTROLENK, FABER, GERB & SOFFEN
ATTORNEYS Sept. 23, 1969     B. C. EISENBERG     3,468,098
SPEAR PACKING APPARATUS
Filed July 21, 1967     5 Sheets-Sheet 3
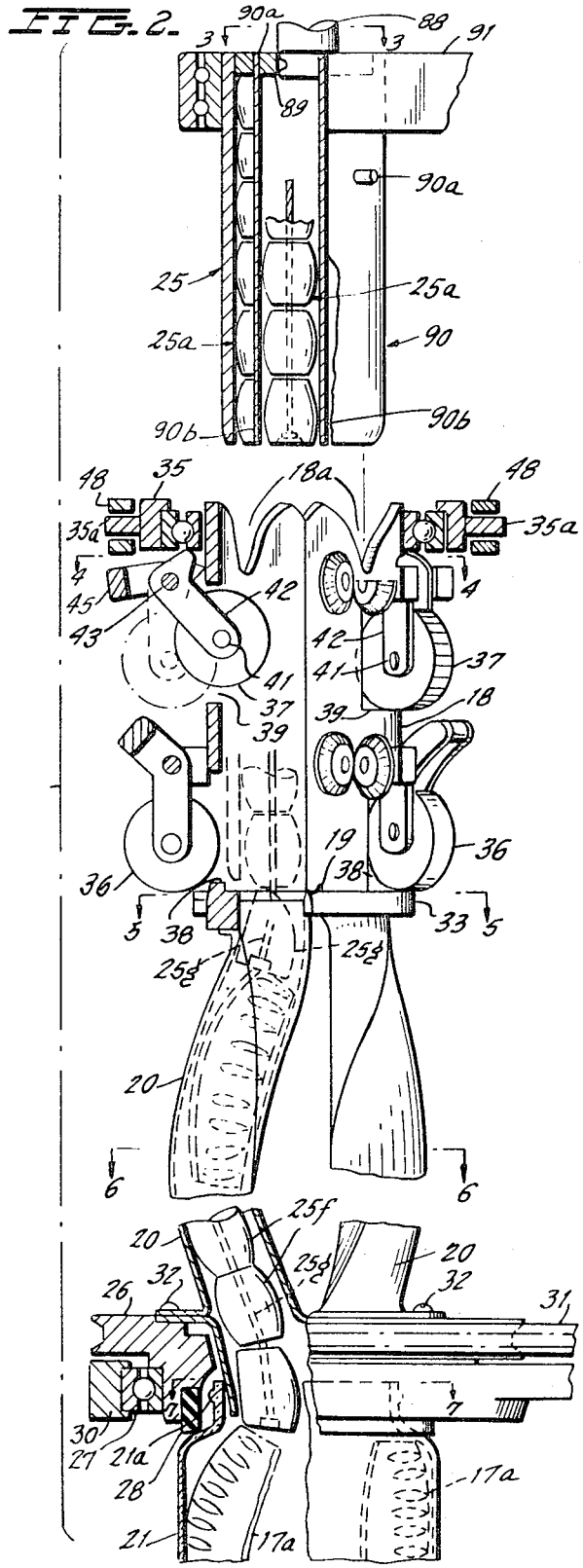
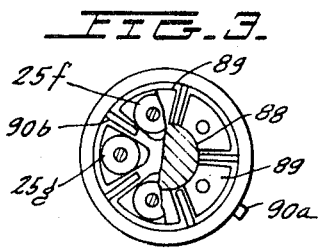
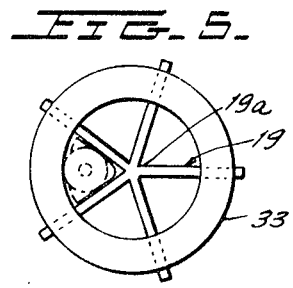
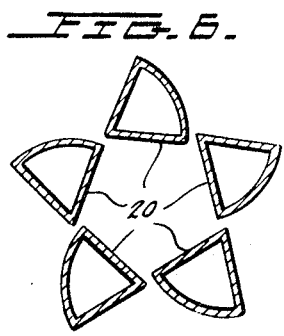
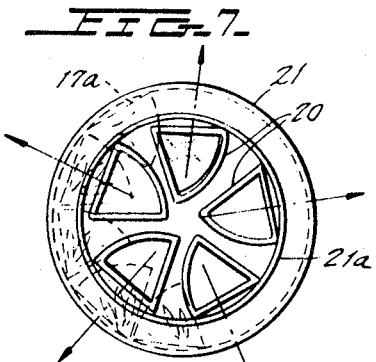
INVENTOR.
BERNARD C. EISENBERG
BY
OSTROLENK, FABER, GERB & SOFFEN
ATTORNEYS Sept. 23, 1969         B. C. EISENBERG         3,468,098
SPEAR PACKING APPARATUS
Filed July 21, 1967         5 Sheets-Sheet 4
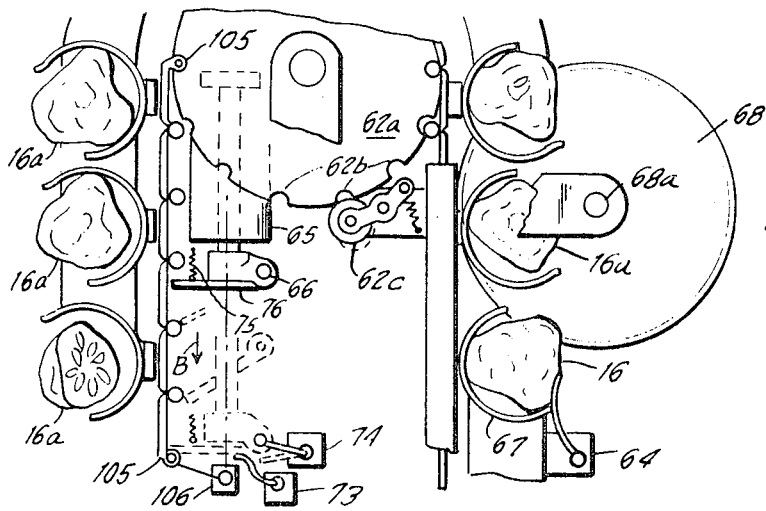
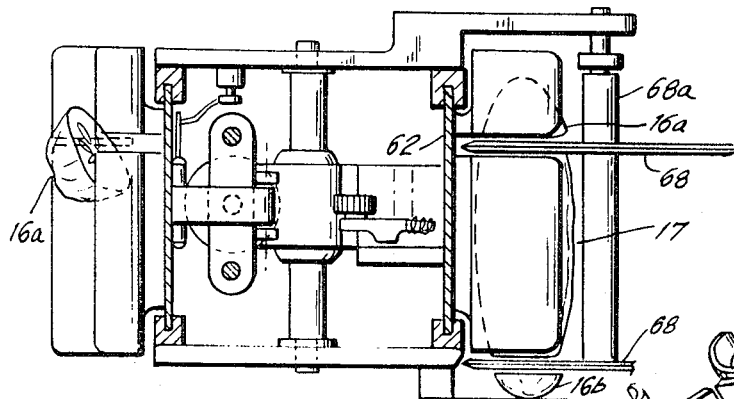
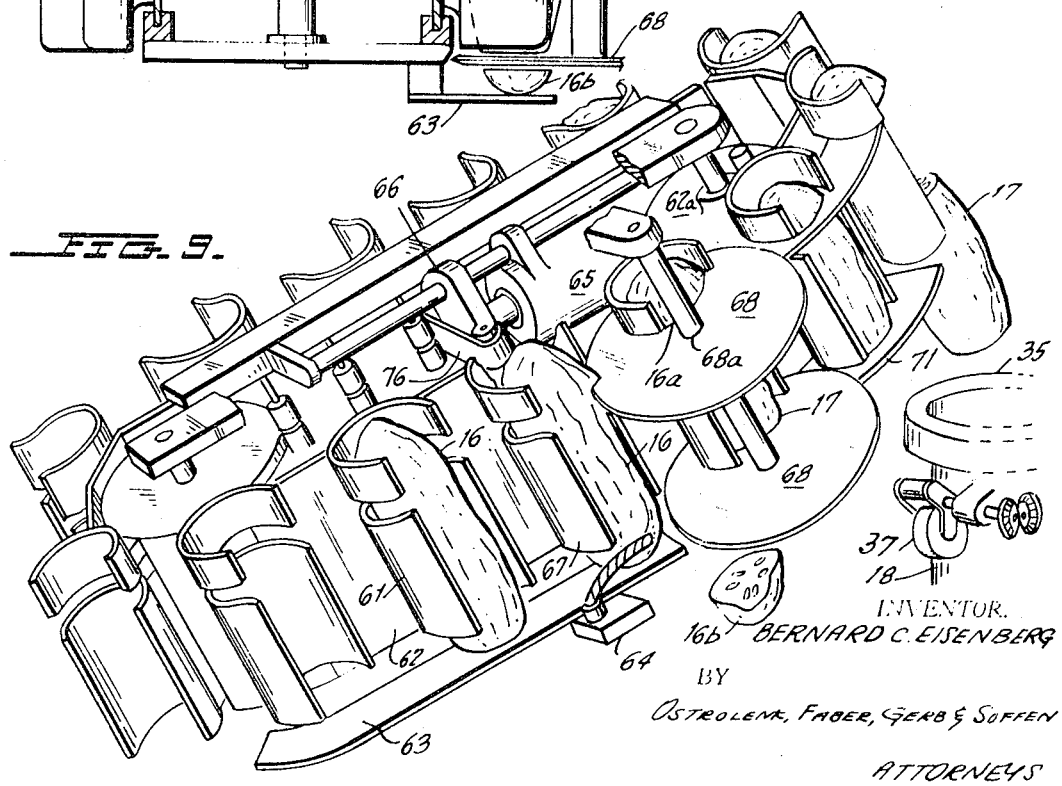
INVENTOR.
BERNARD C. EISENBERG
BY
OSTROLENK, FABER, GERB & SOFFEN
ATTORNEYS Sept. 23, 1969   B. C. EISENBERG   3,468,098
SPEAR PACKING APPARATUS
Filed July 21, 1967   5 Sheets-Sheet 5

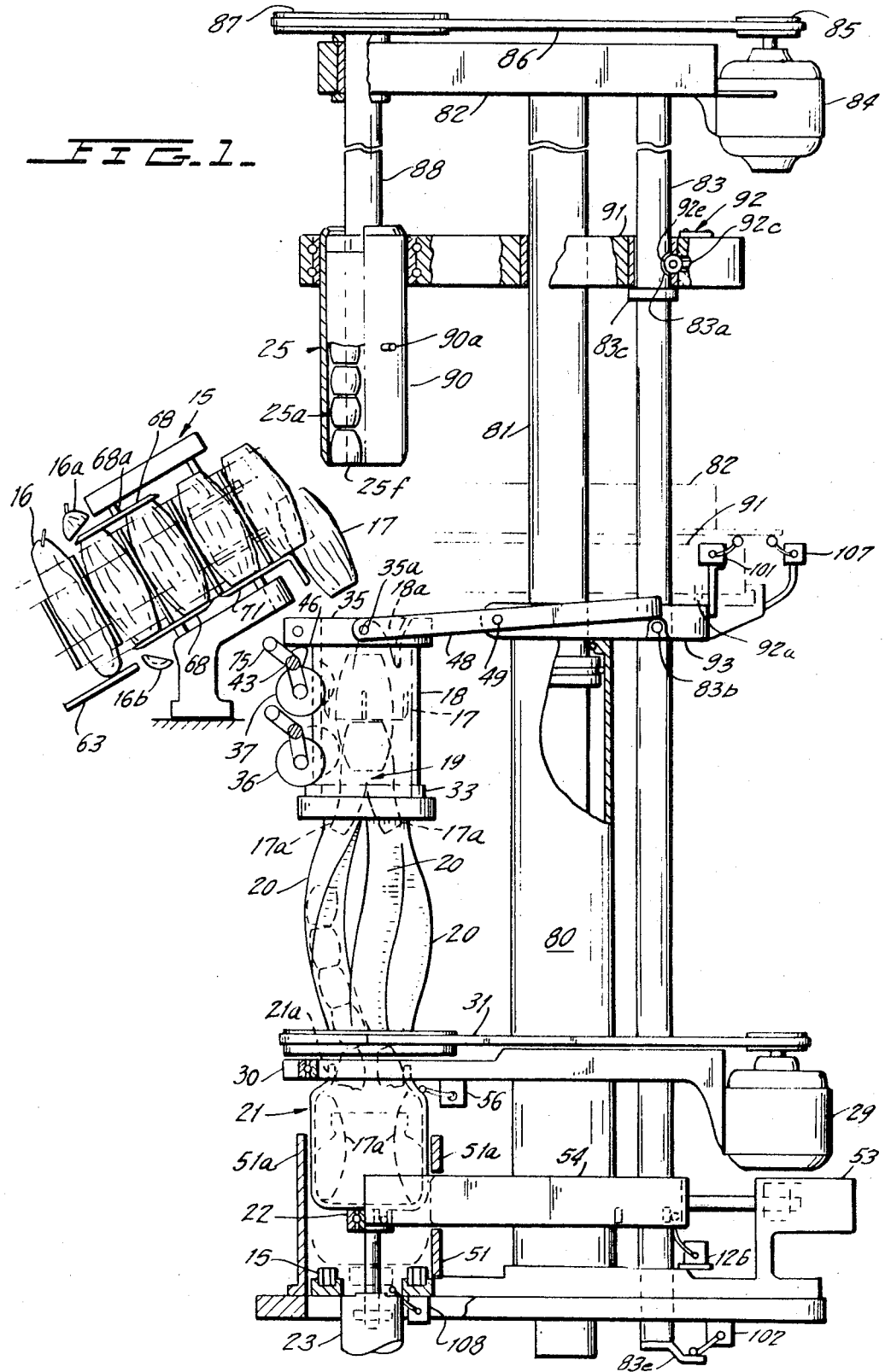

INVENTOR.
BERNARD C. EISENBERG
BY
OSTROLENK, FABER, GERB & SOFFEN
ATTORNEYS

United States Patent Office 3,468,098
Patented Sept. 23, 1969

3,468,098
SPEAR PACKING APPARATUS
Bernard C. Eisenberg, Rockaway, N.J., assignor to Solbern Corp., Fairfield, N.J., a corporation of Delaware
Filed July 21, 1967, Ser. No. 655,157
Int. Cl. B65b 55/00, 35/56, 19/34
U.S. Cl. 53—123      10 Claims

ABSTRACT OF THE DISCLOSURE

There is disclosed herein apparatus for receiving a whole cucumber, cutting off the ends thereof so that a predetermined length remains, feeding this predetermined length to knife means that slits the cucumber longitudinally into spears of segmental cross-section, and feeding the spears through a guide means into a jar so that the spears are oriented to rest against the jar wall with the cut surfaces, rather than the skin or uncut surfaces, of the spears viewable from the exterior of the jar. The guide means is in the form of individual chutes for each of the spears with each chute having a twist therein so that the angular orientation of the spear changes in a controlled manner as the spear passes through the chute. The segmentizing knife means, the chutes and the jar are all rotated during the cutting process, during the period when the spears pass through the chutes and during the period when the spears are fed into the jar. The mouth of the jar is smaller than the diameter of the jar body and the centrifugal force generated by rotation of the chutes and jar forces and spears outwardly as they enter the jar so that one or more layers of spears build up against the jar wall and spears within the jar will not interfere with additional spears entering the jar.

---

This invention relates to automatic packaging apparatus and more particularly relates to apparatus for automatically inserting longitudinally segmentized spears into a glass container with cut surfaces of the spears lying against the side wall of the container.

Process pickles are prepared by packing cleaned cucumbers into containers together with appropriate chemicals and, after the containers are sealed, subjecting the packed containers to an appropriate degree of heat for an appropriate period of time to bring about a desired chemical reaction and to kill bacteria.

For the most part, process pickles are packaged in jars either as whole cucumbers, as disk-like slices, or as spears formed by longitudinally slitting cucumbers into so-called spears having segmental cross-sections. From a marketing viewpoint, it is preferable to package spears so that the seeded surface rather than the skin or uncut surface lies against the jar side wall. Heretofore, this type of packaging was a tedious hand operation adding significantly to the cost of the finished product.

Accordingly, it is a primary object of the instant invention to provide automatic means for the packaging of segmentized spears in jars with the seeded surfaces of the spears positioned the side wall of the jar. This is accomplished by interposing twisted chutes between segmentizing knives and the jar mouth to pivot each of the spears a controlled amount so that as the spears enter the jar each is positioned with a seeded surface thereof facing the side wall of the jar. The chutes as well as the jar rotate as the spears enter the jar so that centrifugal force acts to move the spears radially outward against the side wall of the jar.

Thus, another object of the instant invention is to provide automatic spear packaging apparatus including means for pivoting each of the spears in the region between the segmentizing knives and the mouth of the jar receiving the segments so that the spears are at predetermined angular positions as they enter the jar.

Still another object is to provide novel apparatus of this type utilizing centrifugal force to maintain predetermined orientation of the spears and move the spears radially outward from the jar mouth as the spears enter the jar.

A further object is to provide a novel apparatus of this type including means for cutting cucumbers to predetermined lengths and feeding the cut cucumbers one at a time to a spear forming mechanism.

A still further object is to provide novel apparatus of this type including plunger means which, in a single stroke, positively forces the cut cucumber past the segmentizing knives to form spears and forces these spears into a jar.

These as well as other objects of this invention will become readily apparent after reading the following description of the accompanying drawings in which:

FIGURE 1 is a side elevation of automatic spear forming and packaging apparatus constructed in accordance with the teachings of the instant invention.

FIGURE 1A is a side elevation showing a cross-arm latch in unlatched position.

FIGURE 2 is an enlarged view partially sectioned showing selected portions of the elements of FIGURE 1.

FIGURE 3 is a plan view of the pusher means taken through line 3—3 of FIGURE 2 looking in the direction of arrows 3—3.

FIGURE 4 is a fragmentary plan view showing a portion of the means for centering cucumbers over the segmentizing knives.

FIGURE 5 is a plan view of the segmentizing knives.

FIGURE 6 is a horizontal cross-section taken through the guide chutes at a point intermediate the ends thereof.

FIGURE 7 is a cross-section showing the guide chutes in the region of the jar mouth.

FIGURE 8 is a fragmentary plan view of the jar delivery and takeoff mechanism.

FIGURE 9 is a perspective of the cucumber feeding and cutting mechanism.

FIGURE 10 is a fragmentary side elevation, in partial section, showing selected elements of the feeding and cutting mechanism of FIGURE 9.

FIGURE 11 is a fragmentary plan view of the feeding and cutting mechanism of FIGURE 9.

Figure 12:
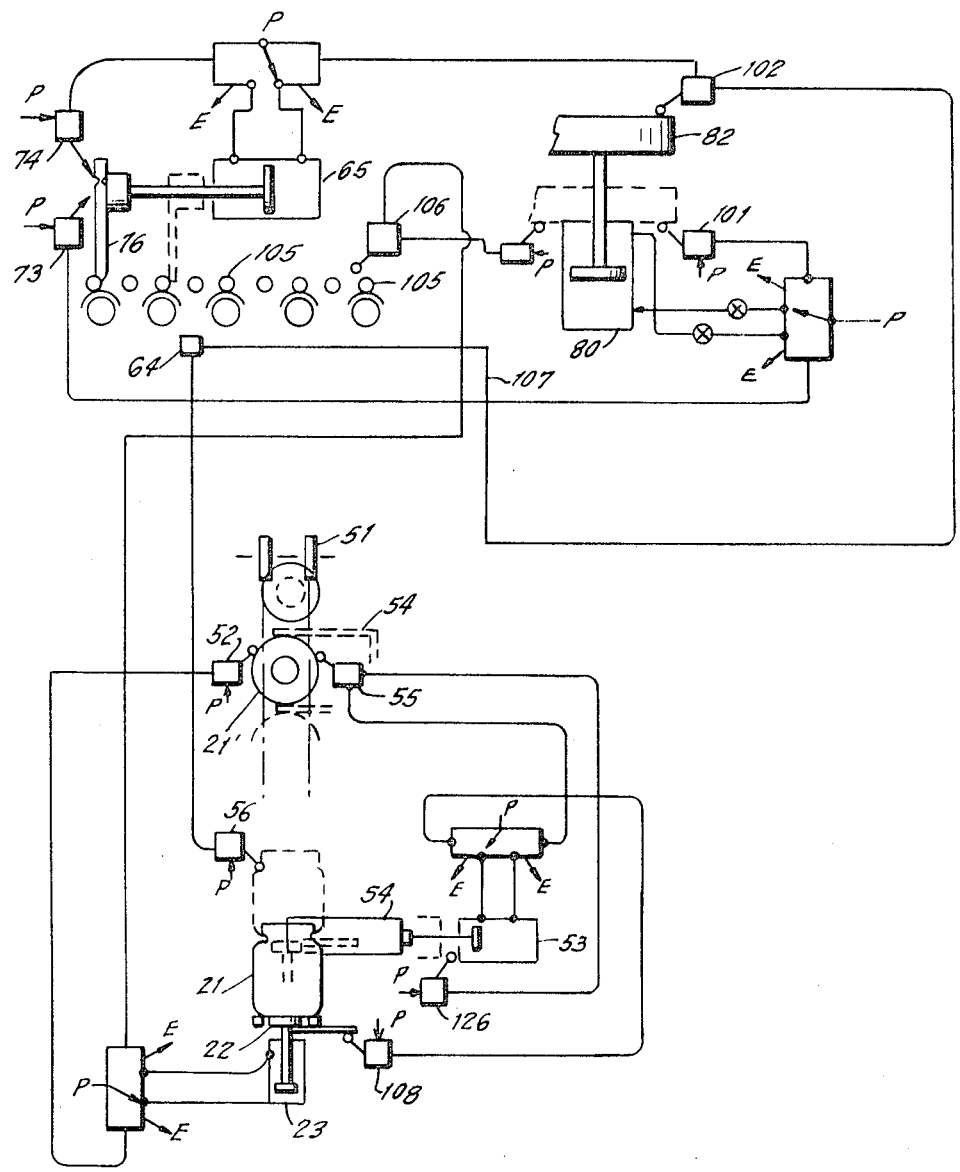
FIGURE 12 is a schematic showing the pneumatic control circuits for the apparatus of FIGURE 1.

Briefly, with particular reference to FIGURE 1 it is seen that the automatic packaging apparatus of the instant invention includes device 15 which receives whole cucumbers 16 and removes the tips 16a, 16b thereof to form cucumbers 17 of predetermined length. The latter are fed one at a time by gravity into cylindrical hopper 18 having segmentizing knives 19 (FIGURE 5) at the bottom thereof. Plunger assembly 25 is operated downward into hopper 18 driving cucumber 17 past segmentizing knives 19 to form five spears each numbered 17a which immediately after formation enter individual chutes each numbered 20 extending into mouth 21a of jar 21 supported in raised position by platform 22 connected to the piston of jar lifting double acting power cylinder 23.

Plunger assembly 25 includes five flexible pusher devices each numbered 25a which, as seen in the dotted line position of FIGURE 1, are movable to the bottom of chutes 20a to positively force spears 17a through jar mouth 21a.

Pulley 26 mounted to frame 30 by bearing means 27 is provided with downward annular extension 28 in frictional engagement with jar 21 so that rotation of pulley 26 by motor 29 acting through belt 31 also rotates jar 21. Screws 32 fixedly secure the lower end of chutes 20 to the upper surface of pulley 26. Segmentizing knives 19 are secured to ring 33 interposed between and fixedly secured to hopper 18 and chutes 20. Bearing 34 secured to ring 35 rotationally supports hopper 18 at its upper end. For a reason which will hereinafter become obvious, pins 35a extending outwardly from ring 35 pivotally connect the latter to clevis 48. The fixed connections between hopper 18, chutes 20 and pulley 26 cause all of these elements to be rotated in unison by motor 29 about a vertical axis extending through the convergence point 19a for the blades of assembly 19.

A cucumber 17 in hopper 18 is centered with respect to knife assembly 19 by two sets of rollers 36, 37 which project through openings 38, 39, respectively, in the sides of hopper 18 to engage the sides of cucumber 17. The five rollers 37 of the upper set are each freely mounted on pin 41 (FIGURES 2 and 4) to the lower end of bifurcated crank 42 between the sections thereof. The central portion of crank 42 is keyed to horizontal pivot 43 which in turn is pivoted on outboard extensions 18b, 18c of hopper 18. The outboard ends of pivots 43 are keyed to bevel gears 44a, 44b which engage bevel gears keyed to the pivots mounting the adjacent cranks 42. The upper end of crank 42 carries counterweight 45 which outweighs wheel 37 so that upon rotation of hopper 18 centrifugal force acts to move weight 45 radially outward which in turn forces wheel 37 radially inward.

Crank 42 is also provided with upwardly projecting nose 46 engageable by the race of bearing 34 through counterclockwise pivoting of clevis 48 about pin 49 when plunger assembly 25 is in its raised or inactive position of FIGURE 1. Engagement of the race of bearing 34 with the crank extensions 46 drives wheels 37 radially outward to the dotted line position of FIGURE 2. The interconnection of all wheels 37 through bevel gears 44a, 44b assures that wheels 37 are always equally spaced from the vertical axis extending through point 19a.

The mounting and interconnections of the five lower wheels 36 is identical to mounting and interconnections between upper wheels 37. However, the cranks for lower wheels 35 are not provided with extensions similar to extension 46 so that as long as hopper 18 rotates at a sufficiently high speed, centrifugal force assures that lower wheels 36 are forced radially inward.

Operation of the packaging apparatus is best explained by first considering jars that are carried single file by conveyor chains 51, 51 (FIGURE 8). When jar 21 reaches control valve 52, piston 53 acts to close gate 54 holding jar 21 in a position above platform 22. At this time, jar 21 also operates control valve 55 causing piston 23 to raise jar 21 into engagement with friction ring 28 at the bottom of pulley 26. Raising of jar 21 operates control valve 56 for a reason which will hereinafter become obvious.

Prior to the foregoing operations, an operator has placed whole cucumbers 16 into pockets 61 and 67 (FIGURE 9) carried on the outer surface of closed chain 62 guided on sprockets 62a. The bottom end of each cucumber 16 is supported by plate 63 with cucumber 16 in pocket 67 engaging the operating extension of control valve 64 connected in series with control valve 56. This operates power cylinder 65 driving piston extension 66 in the direction of arrow B (FIGURE 11) thereby stepping chain 62 in a counterclockwise direction.

Cucumber 16 in pocket 67 moves between vertically spaced knife disks 68, on shaft 68a, which remove the tips 16a, 16b from cucumber 16 and form cucumber 17 of predetermined length. The immediately prior cucumber 17 formed by knives 68, 68 moves onto guide plate 71. At the same time a prior cucumber 17 moves over the forward edge of guide plate 71 and falls into hopper 18 through the upper end thereof.

When piston extension 66 completes its stroke, it operates control valves 73, 74. Valve 74 operates power cylinder 65 to retract piston extension 66 with the ratchet consisting of spring 75 and pivoted arm 76 releasing chain 62 as piston extension 66 retracts. Spring loaded detent wheel 62c cooperates with peripheral notches 62b in sprocket 62a to prevent overtravel of chain 62.

Closing of control valve 73 operates power cylinder 80 (FIGURE 1) to retract or move piston rod 81 downward. Cross arm 82 fixedly secured at the upper end of rod 81 is also fixedly secured at the upper end of rod 83 extending parallel to rod 81. Arm 82 also supports motor 84 having pulley 85 mounted to the output shaft thereof. Belt 86 provides a driving connection between pulley 85 and pulley 87 keyed to the upper end of shaft 88 pivotally mounted to arm 82 and extending parallel to rod 81.

Plunger assembly 25 also includes cylindrical casing 90 which surrounds plunger devices 25a when arm 82 is in the raised position of FIGURE 1. Pusher devices 25a are secured to disk 89 and positioned therebelow. Disk 89 is keyed to the lower end of shaft 88 which extends into casing 90 through the upper end thereof. Casing 90 is rotatably mounted to one end of horizontal arm 91 slideably mounted on rods 81 and 83. The right end of arm 91 is provided with clutch means 92 including pin 92a extending through clearance aperture 92b in slide 92c and forced downward toward the locking position shown in FIGURE 1 by compression spring 92d. In this position pin 92a maintains roller 92e, mounted to the left end of slide 92c, in rod depression 83a so that arm 91 moves downward with rod 83 until pin 92a is forced upward to unlatching position by engagement with fixed member 93. Now the narrow lower end of pin 92a is positioned within aperture 92b permitting slide 92c to move to the right with respect to FIGURE 1 as rod 83 continues downward movement and forces roller 92e out of depression 83a.

With slide 92c to the right as in FIGURE 1A, the right end 92f thereof projects beyond the right end of arm 91 to be captured by the upturned hook portion 93a at the right of member 93. This prevents upward movement of arm 91 without roller 92e being in rod depression 83a. Collar 83c on rod 83 below depression 83a engages arm 91 from below upon upward movement of rod 83 as roller 92e is driven to the left into depression 83a by spring 92g.

When cylinder 80 is actuated to lower rod 81, cross arms 82 and 91 move downward together until arm 91 reaches the dotted line position of FIGURE 1 at which time pin 92a strikes fixed bracket 93 thereby releasing latch means 92. Plunger casing 90 is now disposed within hopper 18. As casing 90 moves toward the bottom of hopper 18, pin 90a protruding outwardly from the side of casing 90 is received in one of the plurality of notches 18a extending downwardly from the upper edge of hopper 18 with each notch 18a being widened at its upper end to facilitate entry of pin 90a. This locates casing 90 in predetermined angular relationship with respect to hopper 18 which in turn positions the inwardly projecting guide vanes 90b of casing 90 in alignment with the blades of knife means 19 so that pusher devices 25a will move between the blades of knife means 19 as shaft 18 continues its downward movement. Further, the engagement of pin 90a by hopper 18 causes casing 90 to rotate at the same speed as hopper 18, knife means 19, chutes 20a and jar 21. Guide vanes 90b extend into radial slots of disk 89 so that pusher devices 25a rotate at the same speed as casing 90.

Again considering cucumber 17 which entered hopper 18, when rod 83 moved downward, pin 83b carried thereby released the rearward extension 48a of clevis 48 allowing the race of bearing 34 to release protruding noses 46 of cranks 42 so that the centrifugal forces acting on counterweights 45 are free to swing rollers 37 into engagement with the skin of cucumber 17 to center it with respect to knife assembly 19. As casing 90 enters hopper 18, pusher devices 25a engage the upper end of cucumber 17 and drive cucumber 17 past the knives of assembly 19 causing cucumber 17 to be slit longitudinally into five spears 17a each of which immediately enters an individual one of the five twisted chutes 20a.

Each of the pusher devices 25a is constructed of a plurality of plastic bead-like members 25f strung on metal thread 25g. This provides the requisite transverse and torsion flexibility and axial rigidity for pusher devices 25a permitting them to enter chutes 20a and move to substantially the lower ends thereof to positively drive spears 17a through jar mouth 21a.

Each of the chutes 20a is of segmental cross-section and at the upper ends the straight sides of all segments converge essentially at the center of rotation passing through point 19a. At a point intermediate the ends of each chute 20a the apex formed by the intersection of the straight sides has rotated clockwise when viewed in FIGURE 6 from the position at the top of the chute, and at the lower end of each chute this apex has rotated even more in a clockwise direction to the position shown in FIGURE 7. Thus, as spears 17a leave chutes 20a a straight or seeded surface, rather than the skin or curved surface, of each spear 17a faces radially outward and such surface moves radially outward against the interior side wall of jar 21 under the action of centrifugal force.

When piston rod 81 completes its down stroke arm 82 is in the dotted line position of FIGURE 1 and operates control valve 101 causing power cylinder 80 to raise piston rod 81. With rod 81 raised to its extended position bracket 83e at the bottom of rod 83 operates valve 102 connected in series with valves 56 and 64 thereby operating power cylinder 65 to move its piston in the direction indicated by arrow B in FIGURE 11 and the cycle previously described is repeated.

Pins 105 (FIGURE 11) carried by chain 62 on the interior surface thereof are spaced three pockets apart so that after a third cucumber 17 enters hopper 18, one of the pins 105 operates valve 106 in series with valve 107 (FIGURE 1). Thus, when arm 82 reaches its low position and operates control valve 107, power cylinder 23 operates to lower jar 21 onto conveyor 51. Platform 22 in its lower position operates valve 108 so that cylinder 53 retracts gate 54 thereby permitting jar 21 to move forward in the direction of arrow A in FIGURE 8 and allowing conveyor 51 to transport the next jar 124 forward between parallel rails 51a, 51a to operate control valve 52 causing gate 54 to move to the left with respect to FIGURE 8 halting jar 124 above platform 22 and the cycle previously described with respect to jar 21 is repeated. Gate 54 in its retracted position operates control valve 126 in series with control valve 55 so that gate 54 must first be fully open in order for valve 55 to be effective in closing gate 54.

It is noted that the first five spears 17a entering jar 21 will not cover the entire side surface thereof. Centrifugal force acting on subsequently entering spears 17a results in the formation of evenly distributed layers of all spears 17a within jar 21. If jar 21 is not filled sufficiently with spears 17a inserted by the apparatus operated as previously described, additional spears may be inserted in random orientation since substantially the entire side wall of jar 21 will have been covered by seeded surfaces of the spears. Further processing will proceed in a manner known to the prior art.

Since the pneumatic controls previously described are only one of many means known to the art for coordinating operation of the various mechanical elements constituting the instant invention, a detailed explanation of the schematic of FIGURE 12 is not deemed necessary or desirable. However, it is noted that the control valves are normally closed units and the operating valves are pilot operated four-way two position units that remain in the positions to which each was last operated until application of a subsequent operating impulse. It is also noted that flow control valves 200, 200 are placed in each line between the operating valve for power cylinder 80 to control the speed at which plunger assembly 25 is raised and lowered.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Apparatus for slicing elongated articles longitudinally into spears having segmental cross-sections and inserting these spears lengthwise into a transparent container with only cut edges of these spears lying against the container side wall; said apparatus including a hopper having an open upper end to receive an elongated article having its axis generally vertical, knife means including upwardly facing cutting means at the bottom of said hopper, first means, operating means for moving said first means from an inactive position withdrawn from said hopper downwardly into said hopper to drive an article therein through said knife means, second means positioned below said knife means to receive spears formed thereby and guide each of such spears through independent limited controlled angular movement, third means for positioning an elongated transparent container with its open end below said second means to receive spears issuing therefrom, and fourth means to rotate said knife means, said first means, said second means and said third means in unison about a vertical axis while said first means moves downwardly whereby centrifugal force acts to drive such spears toward the side wall of a container supported by said third means in a receiving position below said second means.

2. Apparatus as set forth in claim 1 in which the second means comprises a plurality of vertically extending elongated chutes with each of said chutes having a twist therein.

3. Apparatus as set forth in claim 1 in which the knife means includes a plurality of radially extending blade sections and each of said chutes is of generally segmental cross-section with the twist therein being substantially less than 180 degrees.

4. Apparatus as set forth in claim 1 in which the knife means includes a plurality of radially extending blade sections, said second means comprising a plurality of vertically extending elongated chutes equal in number to said blade sections, each of said chutes having a twist therein, said first means including a plurality of flexible elongated pusher sections equal in number to said plurality of chutes; each of said pusher sections being movable into an individual one of said chutes.

5. Apparatus as set forth in claim 4 in which the pusher sections are movable substantially to the bottom of said first means.

6. Apparatus as set forth in claim 4 in which each of said pusher sections comprises a plurality of bead-like portions connected to form an elongated assembly.

7. Apparatus as set forth in claim 4 in which the first means further includes a casing wherein said plurality of pusher sections are disposed when said first means is in said inactive position; fifth means connecting said casing and said pusher sections together for movement in unison while said pusher sections are above said chutes; and additional means for operating said fifth means to release said casing from said pusher sections to permit the latter to move downward independently of said casing to positions deep within said chutes.

8. Apparatus as set forth in claim 7 also including indexing means for maintaining said first means and said knife means in predetermined angular alignment and rotating at equal speeds while said pusher sections are in said chutes.

9. Apparatus as set forth in claim 1 also including means mounted to said hopper for centering articles in said hopper with respect to said knife means and stabilize such articles while they are being driven through said knife means by said first means.

10. Apparatus as set forth in claim 1 also including an article feeding device operated in coordination with said operating means; said device including a cutting means for cutting articles to predetermined length and means for feeding an article cut to predetermined length by said cutting means into said hopper when said first means is in said inactive position.

References Cited

UNITED STATES PATENTS

| | | | |
|---|---|---|---|
| 2,053,238 | 9/1936 | Dulaney | 53—23 X |
| 2,092,763 | 9/1937 | Le Frank | 53—23 |
| 2,092,773 | 9/1937 | Nordquist | 53—123 |
| 2,092,786 | 9/1937 | Taylor | 53—23 |
| 3,119,215 | 1/1964 | Polk | 53—36 |
| 3,136,103 | 6/1964 | Farmer | 53—23 X |
| 3,245,806 | 4/1966 | Miller | 53—35 X |
| 3,351,473 | 11/1967 | Belk | 53—35 X |

FOREIGN PATENTS 1,056,529  4/1959  Germany.

WAYNE A. MORSE, JR., Primary Examiner

U.S. Cl. X.R.

53—142, 148, 159, 253